United States Patent Office 2,778,350
Patented Jan. 22, 1957

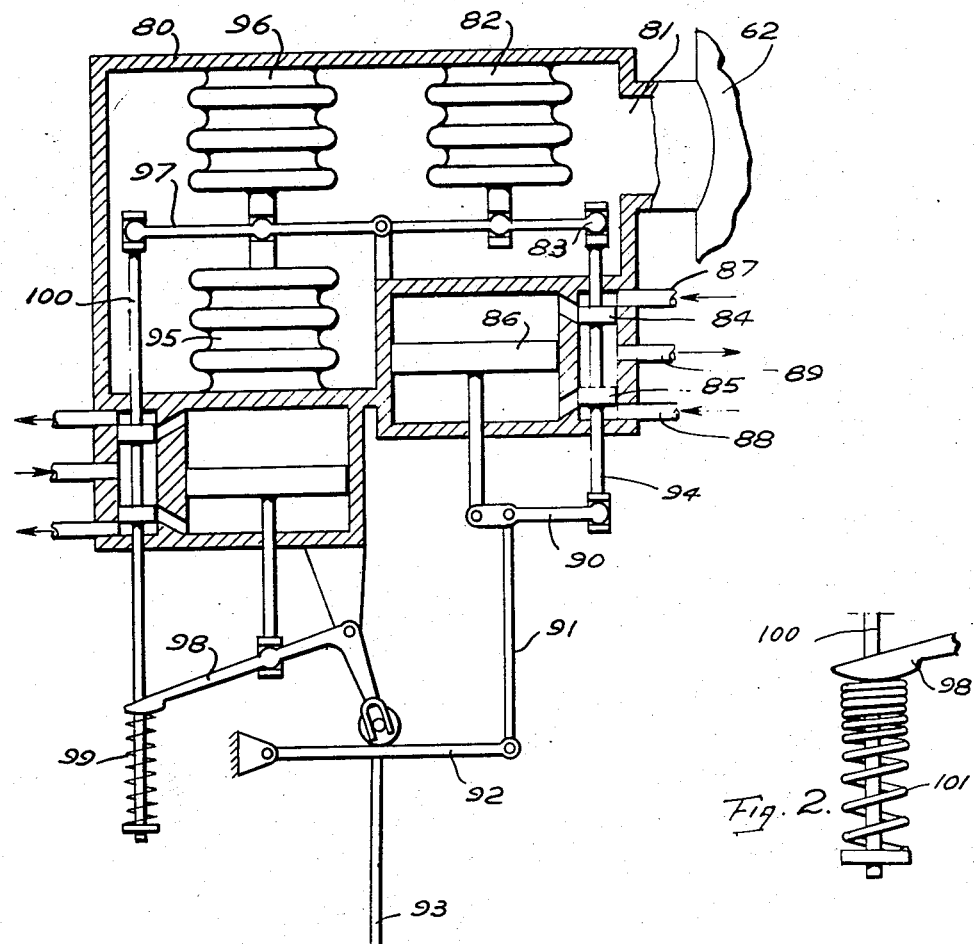
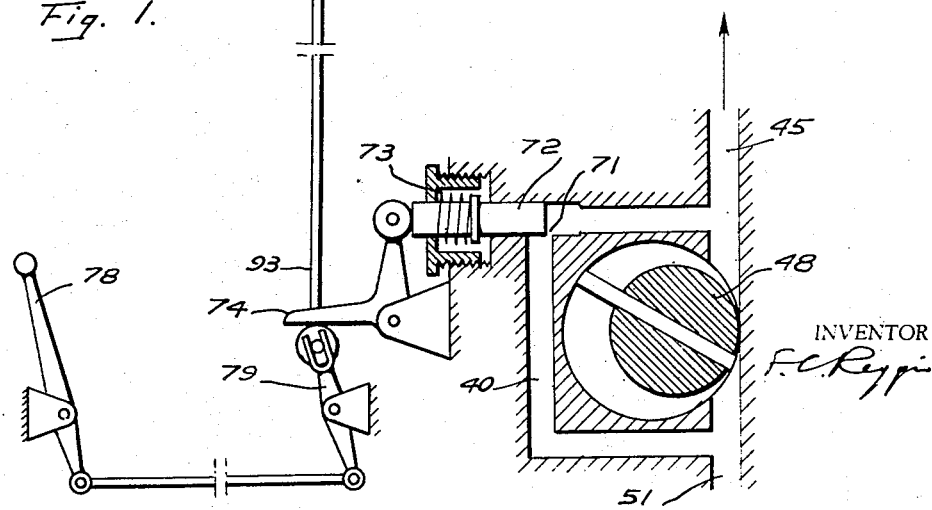

2,778,350

ENGINE FUEL CONTROLLER, INCLUDING INDUCTION AIR PRESSURE AND TEMPERATURE SENSORS

Ferdinando Cario Reggio, Tampa, Fla.

Continuation of application Serial No. 457,758, September 22, 1954, which is a division of application Serial No. 496,296, July 27, 1943, which is a division of application Serial No. 254,355, February 3, 1939, all abandoned. This application July 27, 1956, Serial No. 600,614

23 Claims. (Cl. 123—119)

This invention relates to density responsive control devices utilizing separate pressure and temperature responsive components integrated to obtain a response to variations in density, this application being a continuation of my application Serial No. 457,758 filed September 22, 1954 and a division of my pending application Serial No. 496,296 filed July 27, 1943, which is a division of my application Serial No. 254,355 filed February 3, 1939, all of the above applications having been abandoned.

An object of the invention is to provide a control device comprising separate pressure and temperature sensing components combined to actuate an element to be controlled in direct relation to changes of density.

Another object is to provide a control device having a pressure sensing component and a temperature sensing component coacting to actuate an element to be controlled in predetermined relation to pressure and temperature variations.

A further object is to provide a control device having pressure responsive means and temperature responsive means which, instead of compensating or regulating exactly as a function of density, is capable of producing under or overcompensation for temperature.

Still another object of the invention is to provide a density measuring device wherein the instrumentality to be controlled may be caused to respond in direct proportion to pressure and in inverse proportion to temperature, or in inverse proportion to the square root of temperature (which may be expressed by the following relations, respectively:

$$\frac{P}{T} \text{ or } \frac{P}{\sqrt{T}}$$

or by some similar function.

A further object is to provide a density responsive device capable of transmitting motion or otherwise actuating an element to be controlled in direct relation to changes in density or biased to a greater or lesser degree in relation to changes in the temperature component of density.

The foregoing and other objects and advantages will become apparent as the description proceeds; and while I have illustrated and described the preferred embodiment of the invention as it now appears to me, it will be understood that such changes may be made as fall within the scope of the appended claims. In the following description and in the claims various details will be identified by specific names for convenience, but they are intended to be as generic in the application as the art will permit.

In the drawings:

Figure 1 is a view in sectional elevation of a control device in accordance with the invention; and Figure 2 is a view of a partial modification of Figure 1 showing a resilient means or spring having a non-linear characteristic.

Referring to the drawings in detail, the invention is disclosed by way of example in connection with an engine in which important variations in induction temperature may occur, such as an aircraft engine supercharged for high altitude. A casing 80, whose walls are preferably heat-insulated, communicates through a large duct 81 with the engine induction pipe 62 leading to one or more cylinders or combustion chambers, not shown. Eddy currents or turbulence in said conduit 62 and housing 80 caused by the high velocity of the air flow in pipe 62 as well as the pulsations of pressure therein produce an active thermic exchange, by conduction and convection, whereby the temperature within the casing 80 is substantially the same as the temperature of the induction air in pipe 62. An evacuated resilient bellows 82 in said casing acts on a lever 83 to operate the rod 94 of a pilot valve 84, 85 which controls admission of oil under pressure, usually led from the engine lubricating system through pipes 87, 88 as indicated by the arrows, to opposite sides of a piston 86. A pipe 89 drains oil back to the engine sump. A floating lever 90 is connected at its ends with the rod 94 and piston 86, and at an intermediate point with a rod 91 connected through lever 92, rod 93 and lever 74 with a fuel pressure regulating valve 72 which controls the rate of engine fuel supply. A fuel pump 48, connected through a pipe 51 with a tank, not shown, discharges fuel into a conduit 45 leading, through suitable injection units, to the engine cylinders or combustion chambers. The outlet port 45 and the inlet port 51 of the fuel pump 48 are connected through a by-pass conduit 40 having a variable restriction 71 therein controlled by the pressure regulating valve 72. A highly resilient spring 73 applies to the valve 72 an initial and nearly constant bias in the direction to close the orifice 71. The capacity of the pump 48 is substantially larger than the maximum engine requirements under all operating conditions, and the excess fuel flows constantly through the by-pass orifice 71. It will be appreciated, therefore, that the fuel pressure in the feed line 45 and also the rate of engine fuel flow are controlled in accordance with the variable force applied to the fuel valve 72 through the bell-crank lever 74. Further structural details of the fuel flow control valve 72 and fuel supply system associated therewith are not necessary to the understanding of the present invention, particular arrangements being more fully disclosed in said application Serial No. 496,296.

It is deemed sufficient to state here that in the preferred embodiment the arrangement is such that the engine fuel delivery per cycle is proportional to the load transmitted through the lever 74 to the fuel control valve 72. It will be appreciated therefore that the reaction exerted by the fuel control valve 72 on the lever 74 and other parts of the servo mechanism connected therewith is also proportional to the rate of engine fuel supply.

More generally, the pressure of the fuel in the feed line 45 is a measure of the rate of engine fuel flow. An increase in the load applied through the lever 74 to the fuel valve 72 will increase both the fuel pressure in the feed line 45 and the rate of engine fuel supply, and conversely, a decrease in the force applied by lever 74 to the valve 72 will decrease both the fuel pressure in the feed line 45 and the rate of engine fuel supply. It follows, therefore, that the reaction or force exerted by the pressure of the fuel in the feed line 45 on the inner end of the fuel valve 72 and transmitted thereby to lever 74 and the servo-mechanism pilot valve 84—85 connected therewith is a measure of the rate of engine fuel flow.

Also included in said heat-insulated casing 80 there is a bellows 95 which contains a definite weight of gas or other suitable fluid at constant volume and induction temperature. The absolute pressure in said bellows is therefore proportional to the absolute induction temperature. Bellows 95 and a similar and evacuated bellows 96 act against each other and on a lever 97 to operate the rod 100 of a servo mechanism similar to that already described in detail. Engine lubricating oil is led thereto and evacuated therefrom as indicated by the arrows. The pressure of the air in the housing 80 acts in opposite directions on bellows 95 and 96 and thereby balances out the effect of any change of pressure within the housing 80 so that the load transmitted to lever 97 is only dependent on the induction temperature. The servo mechanism acts on lever 98 to vary the operating distance of rod 93 from the fulcrum of lever 92. A spring 99 balances the load transmitted by the bellows to rod 100 and is designed so that the operating distance of rod 93 from the fulcrum of lever 92 is proportional to the actual absolute induction temperature. Any change in said temperature operates bellows 95 and in turn the servo mechanism to rotate lever 98 and vary the load of spring 99 until the balance of rod 100 in its neutral position is restored. The operating distance of the lower end of link 93 from the fulcrum of lever 74 may be varied by means of a lever 79 which is positioned by a control lever 78 to regulate the engine fuel-air ratio or the rate of fuel flow.

The device operates as follows: The evacuated resilient bellows 82 exerts on rod 94 an upward load proportional to the inductance pressure. In normal operation the rod 94 and pilot valve 84, 85 are maintained in equilibrium in neutral position by a downward load of equal magnitude transmitted from the fuel pressure regulating valve 72 to the rod 94. Thus, for a given position of lever 98 and control lever 78, the induction pressure and the load applied to valve 72 (and in turn the rate of fuel supply) are proportional. If now the induction pressure in the housing 80 varies, for instance decreases, bellows 82 expands and moves the pilot valve 84, 85 downward. Oil under pressure admitted above piston 86 displaces the same downward, causing counterclockwise rotation of lever 74 and displacement of valve 72 toward the left to decrease the rate of engine fuel supply. Conversely, an increase of induction pressure contracts the bellows 82 and thereby determines an increase of engine fuel supply.

As previously stated, the lever 97 actuated by the temperature bellows assembly 95—96 transmits to the pilot valve rod 100 an upward force which is proportional to the induction temperature. In normal operation, that is, under steady temperature conditions, the pilot valve rod 100 is in neutral position and the upward force from the bellows is balanced by the downward load exerted on rod 100 by the spring 99. An increase in induction temperature causes a proportional increase of pressure within bellows 95 which expands the same and lifts the pilot valve, admitting pressure oil above the servo motor piston and causing counterclockwise rotation of lever 98 to increase the load of spring 99 by an amount proportional to the temperature increase, whereupon the pilot valve 100 is restored to its neutral position and the servomotor comes to a stop, the result being that lever 98 assumes a new position of equilibrium in which the distance of the upper end of rod 93 from the fulcrum of lever 92 is increased proportionally to the absolute induction temperature. It follows, therefore, that the upward force applied to the upper end of rod 93 is proportional to the absolute pressure and inversely proportional to the absolute temperature in the induction pipe 62, and is thus proportional to the air density therein.

If the air charge per cycle, or weight of air present in the engine cylinder during the compression and power strokes, is proportional to the induction density, then the mechanism shown in Figure 1 gives for each position of the control lever 78 a corresponding constant fuel-air ratio.

In certain engines it has been found that the air charge is inversely proportional not to the absolute induction temperature, but to the square root thereof. To automatically maintain in such engines a constant value of fuel-air ratio for each setting of the control lever 78, the mechanism of Figure 1 may be modified by substituting for the conventional spring 99 thereof a spring such as shown at 101 in Figure 2, whose deflection, within the designed limits, is proportional to the square root of the load, for example a coil spring having a uniform diameter and a non-uniform pitch so designed that, within the operating range, the number of free or effective coils is inversely proportional to the spring deflection, whereby the distance between rod 93 and the fulcrum of lever 92 is proportional (and thereby the force applied to the rod 93 is inversely proportional) to the square root of the absolute temperature in the induction pipe 62.

In engines in which the air charge is found to be a still different function of the induction temperature, automatic constant value of fuel-air ratio may be obtained either by providing resilient means 101 of suitable characteristic, or by establishing the desired relation between angular position of lever 98 and distance of rod 93 from the fulcrum of lever 92 by means of a cam, substantially as disclosed in said application Serial No. 496,296.

It is to be expressly understood that the invention is not limited to the specific embodiment shown, but may be used in various other ways, and changes, modifications, substitutions, additions and omissions may be made in the construction, arrangements and manner of operation of the parts without departing from the limits or scope of the invention as defined in the following claims.

Where the claims are directed to less than all of the elements of the complete system disclosed, they are intended to cover possible uses of the recited elements in installations which lack the non-recited elements.

I claim:

1. In control apparatus for a combustion engine having an air intake system and a fuel feed sysem for supplying liquid fuel to said engine, the combination with a fuel regulating valve in said fuel system movable to vary the rate of supply of liquid fuel to the engine, of a pressure responsive device including an evacuated bellows insensitive to temperature variations for sensing the pressure in said air intake system, an operative connection including a variable-ratio lever mechanism for actuating said fuel regulating valve from said pressure responsive device, and means responsive to temperature in said air intake system and insensitive to pressure variations therein for controlling the ratio of said lever mechanism.

2. In a fuel control system for a combustion engine having an air induction system and a fuel pump for supplying liquid fuel to the engine, the combination with fuel conduit means adapted for connection with said pump and with said engine, of a fuel control valve in said fuel conduit means movable to vary the rate of fuel flow to said engine, a first hydraulic servomotor, a connection including a variable-ratio lever mechanism for actuating said fuel control valve from said first servomotor, a first pilot valve for controlling the first servomotor, a pressure responsive device insensitive to temperature change and adapted for connection with said air intake system to sense the absolute pressure therein for actuating said first pilot valve, a second hydraulic servomotor, means for varying the ratio of said lever mechanism upon movement of the second servomotor, a second pilot valve for controlling the second servomotor, and a device responsive to temperature in said air induction system and unaffected by pressure variations for actuating the second pilot valve.

3. In an air-consuming combustion engine having an air intake system and a liquid fuel feed system with a fuel pump therein, fuel conduit means connected with said pump and with said engine for supplying fuel to said engine and movable valve means defining a variable-area orifice in said fuel conduit means, a pressure responsive device including an evacuated bellows connected with said air intake system for sensing pressure variations therein and insensitive to temperature changes in said air intake system, a servomotor, a control member for said servomotor, a first operative connection for actuating said servomotor control member from said pressure responsive device, a second operative connection between said servomotor and said valve means for varying the area of said orifice to increase or decrease the rate of engine fuel supply upon increase or decrease of said pressure, respectively, a variable-ratio lever mechanism associated with said second operative connection for modifying the action of the pressure responsive device on the valve means, and means responsive to temperature variations in said air intake system and insensitive to pressure change therein operating through said variable-ratio lever mechanism for altering the area of said orifice to modify the rate of engine fuel supply as a preselected function of said temperature.

4. In a liquid fuel control system for an engine having an air induction system, the combination with a fuel pump and fuel conduit means connected with the pump for supplying liquid fuel to the engine, of valve means in said fuel conduit means for varying the rate of supply of liquid fuel to the engine; and operatively interconnected control means including a manually operable control member for varying the setting of said valve means to regulate said rate of liquid fuel supply, and means for compensating said fuel supply for variations in pressure and temperature in said air induction system; said compensating means including a first component insensitive to ambient temperature changes but responsive to the pressure in said air induction system, operatively associated with a second component responsive to the temperature in said air induction system and insensitive to the pressure therein; said first component being operative to increase or decrease the rate of liquid fuel supply to the engine in response to increase or decrease of pressure in said air induction system, respectively, and said second component including a servo motor, a pilot valve for controlling the servo motor, lever means for actuating the pilot valve, a first expansible bellows arranged to be responsive to the temperature in said air induction system and connected with said lever means for positioning the pilot valve, and a compensating bellows similar to the first bellows but insensitive to the temperature in said air induction system and also connected with said lever means for acting on the pilot valve in opposition to the first bellows to render the operation of the servo motor dependent upon the temperature in said air induction system exclusively.

5. In fuel control apparatus for an engine having an air induction system, the combination with a fuel pump, of fuel conduit means connected with the pump and with the engine for supplying liquid fuel to the engine, fuel valve means in said fuel conduit means movable to vary the rate of engine fuel supply, a hydraulic servo motor with a reciprocable piston, a first operative connection between said piston and said fuel valve means for effecting movement of said fuel valve means, a servo motor control valve, a pressure responsive device including an evacuated bellows substantially unaffected by temperature variations and adapted for connection with said air induction system to sense variations of pressure therein, a second operative connection for actuating said servo motor control valve from said pressure responsive device to increase or decrease the rate of engine fuel supply upon increase or decrease of air induction pressure, respectively, a temperature responsive device adapted for connection with said air induction system to sense temperature variations therein and insensitive to change of pressure in said air induction system, additional connecting means between said temperature responsive device and said fuel valve means for altering the rate of engine fuel supply as a predetermined function of temperature in said air induction system, and manually settable control means operatively connected to modify the action of said pressure and temperature responsive means for variably regulating the rate of engine fuel supply irrespective of the pressure and temperature in the engine air induction system.

6. For an engine having an air intake system leading to a combustion chamber and a liquid fuel feed system for supplying liquid fuel to said combustion chamber, the combination comprising a fuel pump in said liquid fuel system, fuel conduit means in said fuel system connected with said pump and with said combustion chamber, movable valve means defining a variable-area orifice in said liquid fuel conduit means for regulating the rate of supply of liquid fuel to said combustion chamber, and operatively interconnected manually operable control means, pressure responsive means and temperature responsive means for positioning said valve means to adjust the orifice area and thereby controlling said rate of fuel supply, said pressure responsive means comprising a pressure responsive device adapted for connection with said air intake system to sense absolute pressure therein and insensitive to temperature variations for altering the area of said orifice and thereby modifying the action of said manually operable control means to increase or decrease the rate of fuel supply upon increase or decrease of said absolute air pressure, respectively, and said temperature responsive means comprising a temperature responsive device adapted for connection with said air intake system to sense the temperature therein and unaffected by change of air pressure for varying the area of said orifice to modify the rate of fuel supply as a predetermined function of said air intake temperature.

7. In a liquid fuel supply system for a combustion engine having an air supply system, the combination with a liquid fuel pump of fuel conduit means for connecting the pump with the engine to supply a controllable amount of liquid fuel to the engine, a fuel control valve in said fuel conduit means movable to vary the quantity of fuel supplied from said pump to said engine, servo motor means for actuating said fuel control valve, first and second control members operable independently of one another for controlling said servo motor means, a device responsive to the pressure in said air supply system and insensitive to temperature changes therein for actuating said first control member to increase or decrease the supply of liquid fuel to the engine upon increase or decrease of said pressure, respectively, a second device responsive to temperature in said air supply system and insensitive to the pressure therein for actuating said second control member to vary the supply of liquid fuel to the engine as a predetermined function of said temperature, additional control means movable independently of said first and second devices, and an operative connection for actuating said fuel control valve from said additional control means to regulate the supply of liquid fuel to the engine.

8. In control apparatus for an aircraft engine having an air induction system, the combination with a liquid fuel supply system having fuel control means for regulating the rate of supply of liquid fuel to the engine, of a first control component having means responsive to pressure in said air induction system and unaffected by temperature variations therein, an operative connection for actuating said fuel control means from said first control component to increase or decrease the rate of supply of liquid fuel to the engine in response to increase or decrease of said pressure, respectively, a second control component having means responsive to temperature variations in said air induction system and unaffected by pressure changes therein, additional control means including a pilot's control member, and variable-ratio lever means in said operative connection adjusted from said second control component and additional control means for modifying the action of said first control component on said fuel control means to vary the engine fuel supply as a predetermined function of the air induction temperature and the setting of said additional control means.

9. In a liquid fuel feed system for an engine having an air passage with an air supply, the combination with with a fuel pump and fuel conduit means connected with said pump for supplying liquid fuel to the engine, of valve means in said fuel conduit means for varying the rate of supply of liquid fuel to the engine; and operatively interconnected control means having a manually operable lever for actuating said valve means to regulate said fuel supply to the engine, and means for compensating said fuel supply for variations in density of said air supply, including a first component insensitive to ambient temperature changes, but responsive to the pressure of said air supply, operatively associated with a second component responsive to the temperature of said air supply and insensitive to the pressure thereof, said first component being operative to increase or decrease the rate of supply of liquid fuel to the engine in response to increase or decrease in the pressure of said air supply, respectively.

10. In control apparatus for an engine having an air intake system and a liquid fuel supply system with a fuel pump therein and conduit means connected with said pump for feeding liquid fuel to the engine, the combination with valve means in said conduit means for varying the rate of supply of liquid fuel to the engine, of first control means responsive to pressure changes in said air intake system and insensitive to temperature variations therein, an operative connection for actuating said valve means from said first control means to increase or decrease the rate of supply of liquid fuel to the engine in response to increase or decrease of said pressure, respectively, said operative connection including variable-ratio lever means to vary the effect of said first control means upon said valve means; second control means responsive to changes of temperature in said air intake system and insensitive to pressure variations therein; third control means including a manually operable control member; and means for adjusting said variable-ratio lever from said second and third control means.

11. In control apparatus for an engine having an air intake system and a liquid fuel supply system with a fuel pump therein and conduit means connected with said pump for feeding liquid fuel to the engine, the combination with fuel regulating means for varying the rate of supply of liquid fuel to the engine, of first control means responsive to pressure changes in said air intake system and insensitive to temperature variations therein, an operative connection for actuating said fuel regulating means from said first control means to increase or decrease the rate of supply of liquid fuel to the engine in response to increase or decrease of said pressure, respectively, said operative connection including first and second variable-ratio lever mechanisms for varying the effect of said first control means upon said fuel regulating means, second control means responsive to changes of temperature in said air intake system and insensitive to pressure variations therein for changing the ratio of said first variable-ratio lever mechanism, and third control means including a manually operable control member for changing the ratio of the second variable-ratio lever mechanism.

12. In control apparatus for an engine having an air intake system, a liquid fuel supply system with a fuel pump therein, conduit means connected with said pump for feeding liquid fuel under pressure to the engine, and fuel valve means defining variable-area orifice means for varying the rate of supply of liquid fuel to the engine, the combination with fuel control means operatively connected with said fuel valve means for varying the area of said orifice means to regulate the rate of engine fuel supply, of first compensating means responsive to pressure changes in said air intake system and insensitive to temperature variations therein for modifying the area of said orifice means to increase or decrease the rate of supply of liquid fuel to the engine in response to increase or decrease of said pressure, respectively, and second compensating means responsive to changes of temperature in said air intake system but insensitive to pressure variations therein for altering the area of said orifice means to vary the rate of supply of liquid fuel to the engine as a predetermined function of said temperature.

13. In a fuel controller for an engine comprising an air passage with an air supply and a liquid fuel supply, the combination with control means for regulating the supply of liquid fuel to said engine, of means for compensating said liquid fuel supply for variations in density of said air supply, including an element, insensitive to ambient temperature changes, but responsive to the pressure of said air supply, operatively associated with an element responsive to the temperature of said air supply and insensitive to the pressure thereof.

14. In a fuel controller for an engine comprising an air passage with an air supply and a liquid fuel supply, the combination with control means for regulating the supply of liquid fuel to said engine, of means for compensating said liquid fuel supply for variations in pressure and temperature of said air supply, including an element, insensitive to ambient temperature changes, but responsive to the absolute pressure of said air supply, operatively associated with an element responsive to the temperature of said air supply and insensitive to the pressure thereof.

15. In a liquid-fuel feed system for an engine having an air passage, means for varying the rate of supply of liquid fuel to the engine, and means for compensating said supply of liquid fuel for variations in density in said air passage, including an element, insensitive to ambient temperature changes, but responsive to the air pressure in said passage for increasing or decreasing the supply of liquid fuel to the engine upon increase or decrease of said air pressure, respectively, operatively associated with a device responsive to the temperature in said air passage and insensitive to the pressure therein.

16. In a liquid fuel feed system for an engine having an air induction system, including a liquid fuel pump, conduit means connected with the pump for supplying liquid fuel to the engine, and liquid fuel valve means associated with said conduit means for varying the rate of supply of liquid fuel to the engine, the combination with a first control device having a manually operable control member for positioning said valve means to regulate the rate of supply of liquid fuel to the engine, of means for compensating said fuel supply for variations in pressure and in temperature of the air in said induction system, said compensating means including pressure responsive means insensitive to ambient temperature changes but responsive to the pressure of the air in said induction system for moving said valve means to increase or decrease the rate of supply of liquid fuel to the engine upon increase or decrease of said pressure, respectively, and temperature responsive means responsive to the temperature in said induction system and insensitive to the pressure therein for moving said valve means to modify the rate of supply of liquid fuel to the engine as a preselected function of said temperature.

17. In fuel control apparatus for an engine having an air induction system and a liquid fuel supply system with a fuel pump therein and fuel valve means for variably regulating the rate of flow of liquid fuel supplied by the pump to the engine, the combination with first and second motor means each adapted to effect movement of said valve means, of a pressure responsive device including an evacuated bellows substantially unaffected by temperature variations and adapted for connection with said air induction system to sense pressure variation therein for actuating the first motor means to increase or decrease the rate of flow of liquid fuel to the engine upon increase or decrease of pressure in said induction system, respectively, and a temperature responsive device adapted for connection with said air induction system to sense temperature variations therein and insensitive to change of pressure in said air induction system for actuating the second motor means to vary the rate of flow of liquid fuel to the engine as a preselected function of the temperature in said air induction system.

18. In a fuel controller for an engine having an air induction system, and a liquid fuel supply system with a fuel pump therein and fuel regulating means for variably regulating the rate of flow of liquid fuel to the engine, the combination with a servo-mechanism controllable by a plurality of control means for positioning said fuel regulating means, of a first servo-mechanism control means, a pressure responsive device substantially unaffected by temperature variations for sensing pressure variations in said air induction system and actuating said first servo-mechanism control means to increase or decrease the rate of flow of liquid fuel to the engine upon increase or decrease of pressure in said induction system, respectively, a second servo-mechanism control means, and a temperature responsive device for sensing temperature variations in said air induction system and insensitive to change of pressure therein and actuating the second servo-mechanism control means to vary the rate of fuel flow to the engine as a predetermined function of the temperature in said air induction system.

19. In a fuel controller for an engine having an air induction system, a liquid fuel supply system with a fuel pump therein, fuel passage means connected with the pump and fuel regulating valve means associated with said fuel passage means for varying the rate of flow of liquid fuel supplied to the engine, the combination with fluid pressure actuated servo means controllable by a plurality of servo valves for positioning said fuel regulating valve means, of a first servo valve for controlling said servo means, a pressure responsive device substantially unaffected by temperature variations for sensing pressure variations in said air induction system and actuating said first servo valve to increase or decrease the rate of flow of liquid fuel to the engine upon increase or decrease of pressure in said induction system, respectively, a second servo valve for controlling said servo means, and a temperature responsive device for sensing temperature variations in said air induction system and insensitive to changes of pressure therein for actuating the second servo valve to vary the rate of flow of liquid fuel to the engine as a predetermined function of the temperature in said air induction system.

20. In a liquid fuel control for an air-consuming combustion engine having an air induction system, the combination with a fuel regulating valve adapted to vary the rate of liquid fuel supply to the engine as a predetermined function of a variable control pressure applied to said valve, of a pressure responsive device including an evacuated bellows responsive to induction air pressure but unaffected by temperature variations, a hydraulic amplifier controlled by said pressure responsive device, a variable-ratio operative connection between the hydraulic amplifier and the fuel regulating valve for applying to said valve a control pressure varying substantially in direct proportion to the air induction pressure, and an induction temperature responsive device insensitive to the induction air pressure for varying the ratio of said operative connection to alter the effect of said amplifier on the fuel regulating valve as a preselected function of air induction temperature.

21. In control apparatus for a combustion engine having an air intake system and a liquid fuel feed system, the combination with a fuel pump and a fuel passage in said fuel feed system connected with the discharge side of said pump, a fuel pressure regulating means for varying the pressure of liquid fuel in said passage to control the rate of engine fuel supply, said pressure regulating means including means responsive to the pressure of the liquid fuel in said passage, means responsive to air pressure and insensitive to temperature variations in said air intake system operatively connected with said fuel pressure regulating means for actuating the same to increase or decrease the pressure of the liquid fuel in said passage upon increase or decrease of pressure in said air intake system, respectively, and means responsive to temperature in said air intake system and insensitive to pressure variations therein for actuating said pressure regulating means to vary the pressure of the liquid fuel in said passage as a preselected function of the temperature in the air intake system.

22. In a fuel controller for an engine having an air intake system, a liquid fuel supply system, and a fuel regulating valve in said liquid fuel system for varying the rate of supply of liquid fuel to the engine, the combination with hydro-mechanical power means for positioning said fuel regulating valve, of first and second servo valves each operable independently of the other for controlling said power means to adjust said fuel regulating valve, a pressure responsive device sensing the pressure in said air intake system and indifferent to temperature variations therein for actuating the first servo valve to increase or decrease the rate of engine fuel supply upon increase or decrease of said pressure, respectively, and a temperature responsive device including a first element sensing the temperature in said air intake system and a compensating element associated with the first element to render the same indifferent to air pressure variations for actuating the second servo valve to vary the rate of engine fuel supply in predetermined relation to said temperature.

23. In a liquid fuel controller for an engine having an air induction system, comprising a liquid fuel regulating member subject to a variable control load in one direction and arranged to vary the rate of supply of liquid fuel to the engine as a predetermined function of said control load, the combination with hydraulic means for applying said variable control load to the fuel regulating member, of a first valve and a second valve operable independently of one another for controlling said hydraulic means to vary said control load, a pressure responsive device including an evacuated bellows responsive to the absolute pressure in said air induction system and unaffected by temperature changes for actuating said first valve, and an induction temperature responsive device insensitive to the induction air pressure for actuating the second valve.

References Cited in the file of this patent
UNITED STATES PATENTS
1,913,684    Purdy _____ June 13, 1933